United States Patent

[11] 3,561,417

| [72] | Inventor | Wayne Allman Downey |
| | | Dubuque, Iowa |
| [21] | Appl. No. | 800,461 |
| [22] | Filed | Feb. 19, 1969 |
| [45] | Patented | Feb. 9, 1971 |
| [73] | Assignee | Deere & Company |
| | | Moline, Ill. |
| | | a corporation of Delaware |

[54] EXTERNALLY-MOUNTED OIL COOLER FOR INTERNAL-COMBUSTION ENGINES
6 Claims, 5 Drawing Figs.

[52] U.S. Cl. .................................................. 123/196,
 165/155; 184/104
[51] Int. Cl. ................................................ F01m 5/00,
 F16n 39/02
[50] Field of Search ................................. 165/155,
 142; 123/196A, 196 (AB); 184/104, 104A, 104B

[56] References Cited
UNITED STATES PATENTS

| 1,856,771 | 5/1932 | Loeffler | 165/155X |
| 1,902,970 | 3/1933 | Ramsaur et al. | 184/104X |
| 2,419,264 | 4/1947 | Holmes et al. | 165/155 |
| 3,465,847 | 9/1969 | Donath et al | 184/104X |

*Primary Examiner*—Manuel A. Antonakas
*Attorneys*—H. Vincent Harsha, Harold M. Knoth, William A. Murray, John M. Nolan and Jimmie R. Oaks

ABSTRACT: An oil cooler for an internal-combustion engine mounted externally of the cylinder block and having coolant-carrying conduits mounted in heat-transfer relationship to oil-carrying conduits. The oil cooler includes an adapter portion mounted on the connection that is normally provided on a tractor for mounting an oil filter and the adapter in turn provides a connection for an oil filter. The adapter is constructed so as to channel heated oil from the engine to the cooling conduits and from there direct the oil through the filter then back to the engine.

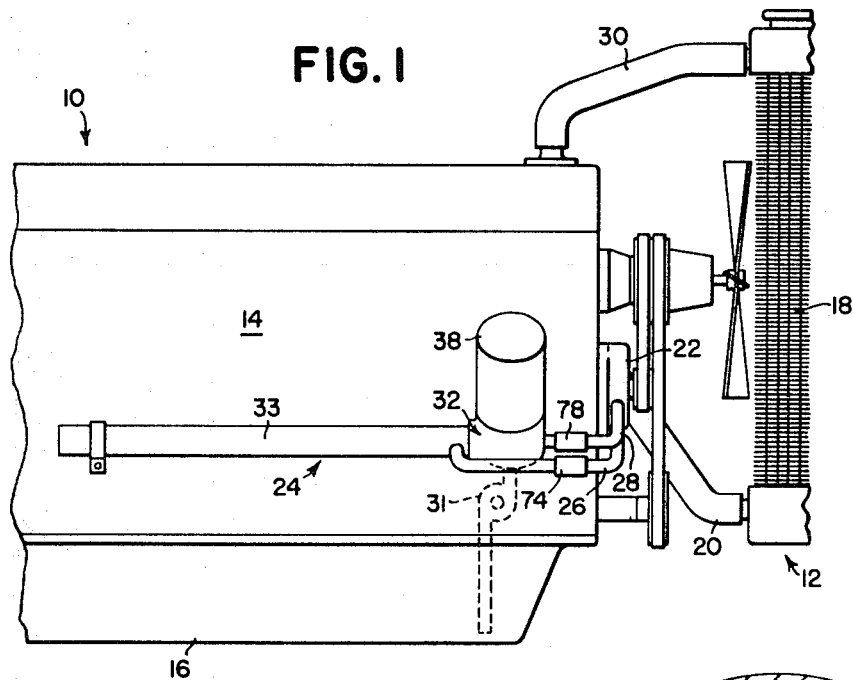
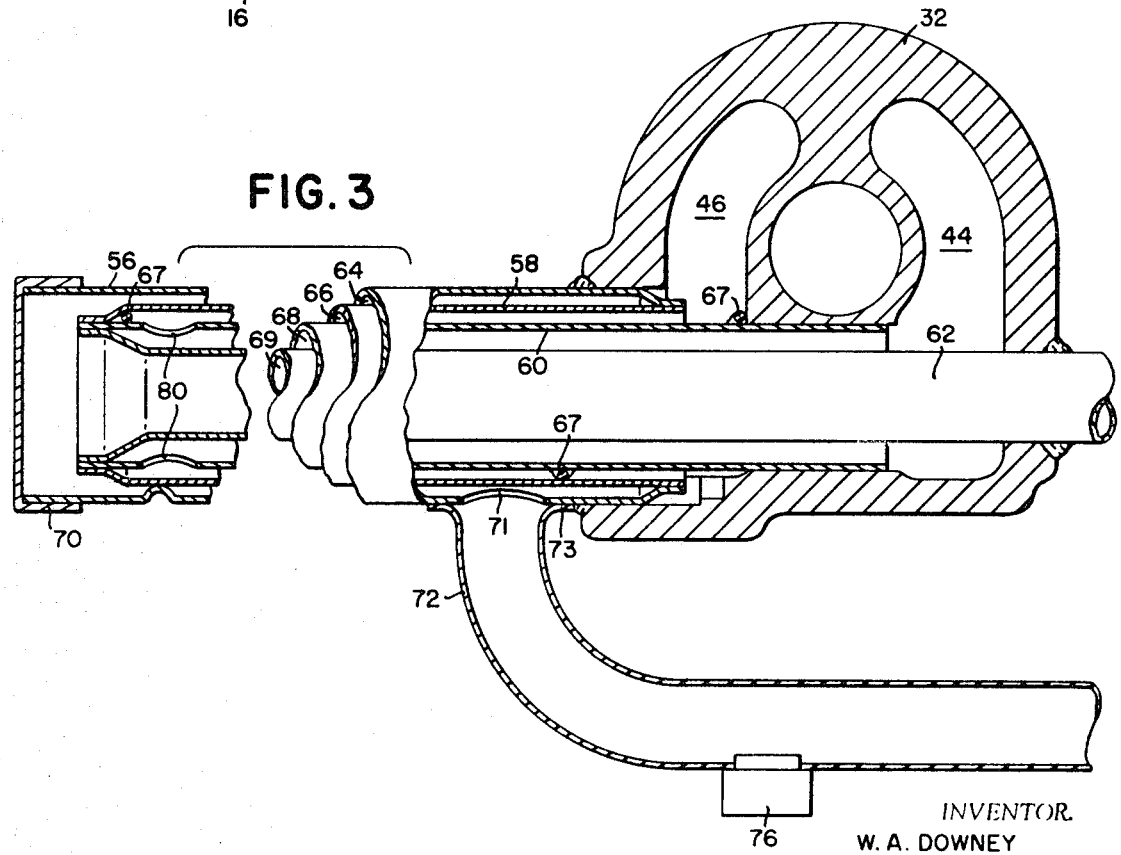

INVENTOR.
W. A. DOWNEY

EXTERNALLY-MOUNTED OIL COOLER FOR INTERNAL-COMBUSTION ENGINES

BACKGROUND OF THE INVENTION

The present invention relates to an externally mounted oil cooler wherein heat is transferred from hot oil from the engine pan by circulating the oil through one set of conduits positioned in heat-transfer relationship to a set of coolant-carrying conduits.

It is known to provide coolant-carrying conduits in the oil pan of an internal-combustion engine for cooling the oil. These coolers are somewhat inaccessible, requiring the oil pan to be removed in order to check the cooling conduits for corrosion which might cause blockage of water flow resulting in the oil overheating or in the water leaking into the oil. Also known are externally mounted oil coolers; however, they are often bulky and require numerous fittings for integrating them into existing cooling systems.

The above-noted faults are overcome by the unique construction of the present invention which is compact, readily accessible, and easy to maintain.

SUMMARY OF THE INVENTION

According to the present invention, there is provided an externally mounted oil cooler for an internal-combustion engine.

More specifically, it is an object of this invention to provide an oil cooler wherein fluid conduits are positioned in concentric relationship to one another, some of the conduits carrying oil and some of the conduits carrying coolant.

Still another object is to provide an adapter for mounting an oil cooler to an engine cylinder block in place of the normally provided oil filter, the adapter being constructed for connecting the oil filter thereto.

A further object is to provide a compact, easily maintainable, and economical oil cooler.

These and other objects will become apparent from the following description and accompanying drawing.

BRIEF DESCRIPTION OF THE DRAWINGS

FIG. 1 is a side view of an engine with the oil cooler of this invention attached thereto;

FIG. 3 is a sectional taken alone line 3–3 of FIG. 2;

DESCRIPTION OF THE PREFERRED EMBODIMENT

Figure 2:
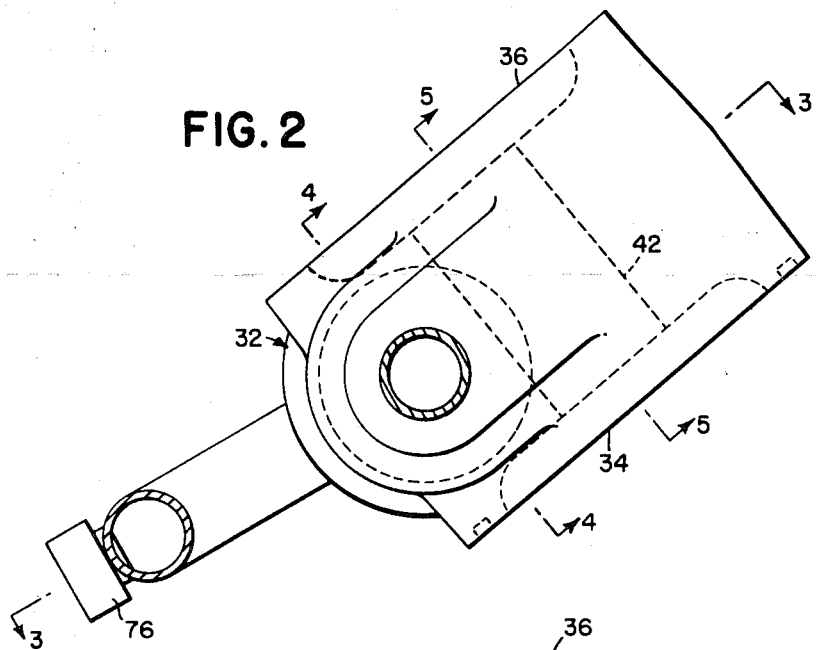
FIG. 2 is a right end view of the oil cooler of FIG. 1 shown removed from the engine.
Figure 4:
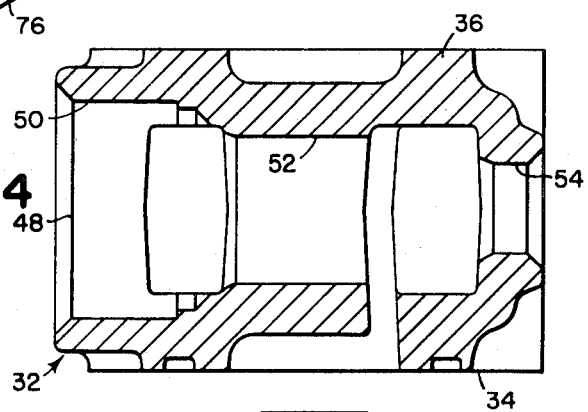
FIG. 4 is a sectional taken alone line 4–4 of FIG. 2 but showing only the adapter.
Figure 5:
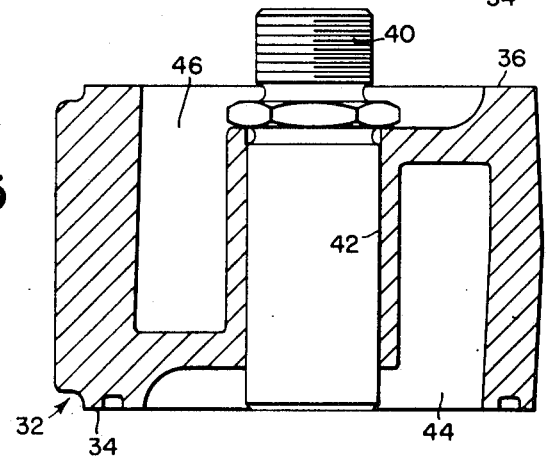
FIG. 5 is a sectional taken along line 5–5 of FIG. 2.

The invention is embodied in the construction shown in FIG. 1 wherein an internal-combustion engine 10 has a cooling assembly generally designated by the numeral 12. The engine 10 includes a cylinder block 14 and an oil pan 16. The cooling assembly includes a radiator 18 which has a hose 20 attached to the lower portion thereof for supplying coolant, such as water, to the intake of a pump 22, which pump forces one stream of the coolant into an oil cooler 24 via a fluid line 26 and another stream of the coolant into the cylinder block 14. The coolant returns from the oil cooler 24 to the intake of the pump 22 through a fluid line 28 and the coolant which has been circulated through the cylinder block 14 is returned to the top of the radiator 18 via a hose 30. An oil pump 31 delivers oil from the oil pan 16 to the oil cooler 24 and from there the oil is circulated to the engine bearings as will be more apparent from the following description.

The oil cooler 24 is comprised of two portions, the first of which is a substantially cylindrical adapter portion 32 and the second of which is a heat-transfer portion 33. The adapter portion 32 has a first end 34 connected to a conventional oil filter connection (not shown) extending from the cylinder block 14 and a second end 36 to which an oil filter 38 is connected. The oil filter 38 is a known type (see U.S. Pat. No. 3,054,262, for example), the construction being such that the oil passes up through an annular filter arrangement and then passes downwardly through a centrally located bore. The adapter is secured to the oil filter connection, and the oil filter is secured to the adapter by means of a nipple 40 which extends through a bore 42 formed axially through the adapter 32. Spaced radially from the bore 42 are a pair of axially extending cavities 44 and 46. The cavity 44 extends from the end 34 of the adapter almost to the end 36, and the cavity 46 extends from the end 36 of the adapter almost to the end 34. An axially aligned passage 48 is formed through the adapter at a location midway between the ends 34 and 36 and is offset so as not to intersect the bore 42. The passage 48 consists of a first bore 50 which extends through one side of the adapter to the cavity 46, a second bore 52 having a smaller diameter than bore 50 which joins cavities 46 and 44, and a third bore 54 having a smaller diameter than bore 52, which extends through the other side of the adapter to cavity 44.

The heat-transfer portion 33 of the oil cooler 24 is comprised of a series of four generally cylindrical concentrically mounted tubes which, considered in order from the outside tube to the inside tube, are designated by the numerals 56, 58, 60, and 62, respectively. The tubes are spaced from each other so as to form annular fluid passages along their walls. A first passage 64 extends between tubes 56 and 58, a second passage 66 extends between tubes 58 and 60 and contains a turbulator 67 in the form of a wire wound to form a helix about the tube 60, and a third passage 68 extends between tubes 60 and 62. The innermost tube 62 is open-ended and defines a fourth fluid passage 69. The outside tube 56 has a fluidtight cap 70 over its left end, and its right end tightly engages and extends through the bore 50 formed in the adapter 32 and terminates in the cavity 46. A port 71 is formed in the outer tube in the right end portion adjacent the adapter, and a fluid line 72 has one end portion 73 welded about the port and the other end portion is coupled to the fluid line 26 by means of a coupler 74. The fluid line 72 is lower than the remainder of the cooler and has a drain plug 76 located therein for allowing coolant to be drained from the oil cooler. The left ends of the tubes 58, 60, and 62 terminate in a common plane spaced axially from the cap 70 and are welded together to form a fluidtight seal. A plurality of ports 80 are formed in the left end portion of the tube 60, thus joining the fluid passages 66 and 68. The right end of tube 58 terminates in a plane common with the right end of tube 56, and these ends are also welded together to form a fluidtight seal. The tube 60 extends through and tightly engages the bore 52 which interconnects cavities 44 and 46 of the adapter, and the right end of the tube terminates in the cavity 44. The right end portion of the tube 62 extends through and tightly engages the bore 52 and is coupled to the fluid line 28 by means of a coupler 78. The tubes are held in a desired relationship with respect to the adapter by means of welds between the adapter and the outside tube 56 and the inside tube 62.

The operation of the oil cooler 24 begins with the starting of the engine 10. The pump 22 draws low temperature coolant from the bottom of the radiator 18 through the hose 20 and delivers a part of the coolant to the cylinder block and the remainder of the coolant to the oil cooler passage 64 via the fluid lines 26 and 72 and the port 71. The coolant flows from the passage 64 to the left-hand end of the tube 56 and from there returns, in a somewhat heated state, through the passage 69 to the intake side of the pump where it is mixed with the low temperature coolant and recirculated through the cooling system. Simultaneously with the circulation of the coolant by the pump 22, the oil pump 31 draws oil, which after a period of operation of the engine is at a high temperature, from the oil pan 16 and delivers it to the passage 68 of the oil cooler 24 via the cavity 44 of the adapter 32. As stated above, the oil flows from the passage 68 into the passage 66 via ports 80, and from the passage 66 the oil, which is now somewhat cooled, passes through the cavity 46 upwardly through the filtering element of the oil filter 38, and then the oil passes downwardly through the nipple 40 and from there is circulated to the engine bearings. The turbulator 67 which is contained in the passage 66 serves to increase the amount of heat transferred from the oil by mixing the oil and lengthening the path of travel of the oil. Should it ever be desired to drain the coolant from the oil cooler, drain plug 76 is merely removed from the fluid line 72.

While a preferred embodiment of the invention has been shown and described, it will be apparent that variations and modifications thereof may be made without departing from the underlying principles thereof.

I claim:

1. An oil cooler for an internal-combustion engine comprising: a first elongate fluid passage means including two concentrically arranged relatively thin-walled portions, a second fluid passage means also including two concentrically arranged relatively thin-walled portions, said concentric portions of said second elongate fluid passage means being concentric with and being positioned between and sharing a wall with each of the two concentric portions of said first fluid passage means, means adapted for connecting one end of one of said first and second fluid passage means to the output side of a coolant pump and means adapted for connecting the other end of said one of said first and second fluid passage means to the input side of the coolant pump, and means adapted for connecting one end of the other of said first and second fluid passage means to the output side of an oil pump and for connecting the other end of said other of the first and second fluid passage means to oil lines for circulating oil to the engine bearings.

2. The invention as defined in claim 1 wherein the concentrically arranged portions of the first and second fluid passage means are comprised of first, second, third, and fourth tubular members, the second, third, and fourth tubular members being progressively lesser in cross-sectional dimension than the first tubular member and wherein the space between the first and second tubular members and the passage defined by the fourth tubular member comprise the first fluid passage means and wherein the space between the walls of the second and third tubular members and the space between the walls of the third and fourth tubular members comprise the second fluid passage means.

3. The invention as defined in claim 1 wherein the last-mentioned means comprises a generally cylindrical adapter having first and second ends, a bore extending axially through said first and second ends, first and second axially extending cavities formed in said adapter, said first cavity extending from said first end toward said second end and said second cavity extending from said second end toward said first end, said one and other ends of said second fluid passage means extending into said first and second cavities, respectively, of said adapter, and a connector extending through said bore and being adapted for holding said first and second cavities in respective positions for receiving oil from the output side of an oil pump and for delivering oil to oil lines for circulating oil to the engine bearings.

4. In an internal-combustion engine including a radiator, a coolant pump, a fluid conduit connecting the input side of said coolant pump to said radiator, an oil pan, an oil pump, a fluid conduit connecting the input side of the oil pump to said oil pan, an engine cylinder block, a connection for a conventional, externally mounted full flow oil filter extending outwardly from said cylinder block, and conduit means connecting said connection to the output side of said oil pump, the improvement comprising: an externally mounted oil cooler comprising a first elongate fluid passage means including two concentrically arranged relatively thin-walled portions, a second fluid passage means also including two concentrically arranged portions, said concentric portions of said second elongate fluid passage means being concentric with and being positioned between and sharing a wall with the two concentric portions of said first fluid passage means, means adapted for connecting one end of said first fluid passage means to the output side of a coolant pump and means adapted for connecting the other end of said first fluid passage means to the input side of the coolant pump, a generally cylindrical adapter having first and second ends, a bore extending axially through said first and second ends, first and second axially extending cavities formed in said adapter, said first cavity extending from said first end toward said second end and said second cavity extending from said second end toward said first end, one end of said second fluid passage means extending into said first cavity and the other end of said second fluid passage means extending into said second cavity of said adapter, and a nipple extending through said bore in said adapter and having one end connected to said oil filter connection and an oil filter connected to the other end of said nipple whereby oil from the output side of the oil pump passes through the second cavity into said second fluid passage means and from there flows through said second cavity into said oil filter, through the nipple to oil lines for circulating oil to the engine bearings.

5. The invention as defined in claim 1, and further including turbulator means positioned at least along part of the length of said other of said first and second fluid passage means for defining a path of travel longer than the length of the part of the fluid passage with which it is associated whereby the cooling of oil flowing through said other of said first and second fluid passage means will be enhanced.

6. The invention as defined in claim 2 and further including turbulator means positioned at least along part of the length of said other of said first and second fluid passage means for defining a path of travel longer than the length of the part of the fluid passage with which it is associated whereby the cooling of oil flowing through said other of said first and second fluid passage means will be enhanced.